US006844846B1

(12) United States Patent
Riday

(10) Patent No.: US 6,844,846 B1
(45) Date of Patent: Jan. 18, 2005

(54) MULTI-MODE GPS RECEIVER

(75) Inventor: Ossian Riday, Topsham, ME (US)

(73) Assignee: Delorme Publishing Co., Yarmouth, ME (US)

( * ) Notice: Subject to any disclaimer, the term of this patent is extended or adjusted under 35 U.S.C. 154(b) by 0 days.

(21) Appl. No.: 10/655,937

(22) Filed: Sep. 5, 2003

Related U.S. Application Data

(60) Provisional application No. 60/410,400, filed on Sep. 13, 2002.

(51) Int. Cl.[7] .............................. H04B 7/185; G01S 5/02
(52) U.S. Cl. ................................ 342/357.1; 342/357.12
(58) Field of Search ........................ 342/357.06, 357.1, 342/357.12, 357.13; 701/213, 215

(56) References Cited

U.S. PATENT DOCUMENTS

| 6,007,372 A | 12/1999 | Wood |
| 6,260,084 B1 | 7/2001 | Wilson et al. |
| 6,389,359 B1 | 5/2002 | Potter et al. |
| 6,480,146 B1 * | 11/2002 | Ferrandis et al. ...... 342/357.06 |
| 2003/0163587 A1 * | 8/2003 | Knight et al. ................ 709/249 |
| 2003/0191562 A1 * | 10/2003 | Robertson et al. ............ 701/21 |
| 2003/0212480 A1 * | 11/2003 | Lutter et al. .................. 701/33 |

FOREIGN PATENT DOCUMENTS

JP    2002162457    6/2002

* cited by examiner

*Primary Examiner*—Dao Phan
(74) *Attorney, Agent, or Firm*—Patricia M. Mathers; Thomas L. Bohan

(57) ABSTRACT

A GPS data transceiver system capable of transceiving USB and/or RS-232 data between a host computer and a multi-mode GPS-receiver. The USB circuitry is incorporated into the multi-mode GPS-receiver and the RS-232 circuitry is incorporated into the multi-mode GPS-receiver or into an external power source, such as a battery pack. Depending on the data signal from the host computer, the data input/out device functions as a USB device or an RS-232 device.

20 Claims, 4 Drawing Sheets

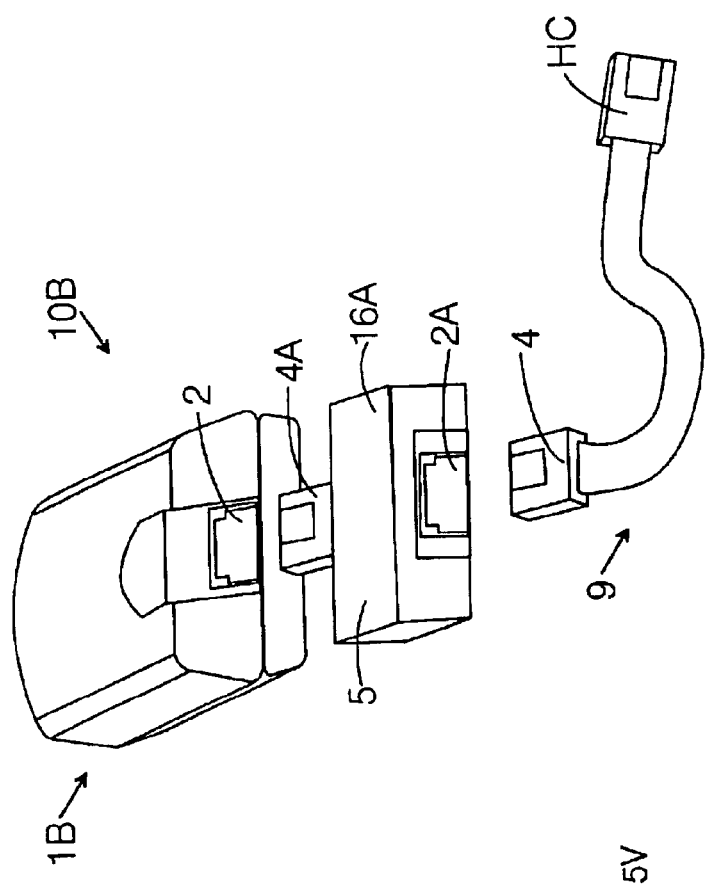
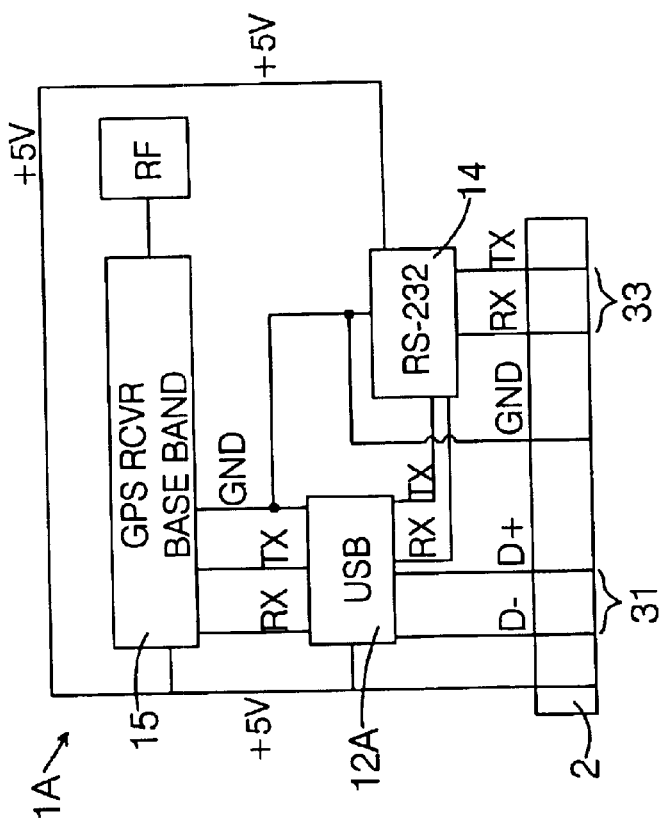
FIG. 4
FIG. 3

MULTI-MODE GPS RECEIVER

This application claims priority from provisional application 60/410,400, filed on Sep. 13, 2002.

BACKGROUND INFORMATION

1. Field of the Invention

The present invention relates to the field of data transmission between a global positioning satellite (GPS) receiver and a computer host device. More particularly, the present invention relates to a data transmission between the GPS receiver and computer host devices that provide various types of serial data ports. More particularly yet, the present invention relates to a method of and system for data transmission between the GPS receiver and a host device that provides a USB and/or a RS-232 data port.

2. Description of the Prior Art

Most personal computers (PCs) are equipped with one or more serial ports for connecting peripherals or accessory devices. The serial ports are typically RS-232 ports with a multi-pin connector, such as a DB 9-pin or DB 25-pin connector. Some computer host devices have a USB port in addition to the RS-232 port, and still other host devices, particularly very small devices, such as the personal digital assistant (PDA), provide only an RS-232 port for connecting peripheral devices or accessories. In the foreseeable future, PDAs may incorporate a suitable USB port. A USB signal is transmitted with a +5V signal for powering a peripheral device; an RS-232 signal is not, and a separate power source is required to power the peripheral device.

Nowadays, users of a data input device, and particularly, a GPS receiver, would like to be able to carry a small lightweight data input device with them into various environments and connect them with a number of different host devices, such as a portable PC or a data logger. The GPS receiver must be small, lightweight and, ideally, connectable and capable of interfacing with host devices that provide a USB signal and/or an RS-232 signal. In order to achieve this connectability with USB and RS-232 devices today, a USB cable is required to connect the device to a host computer with only a USB port, and an RS-232 data cable, or a USB/RS-232 cable adapter, plus a separate power cable and battery pack, is needed to connect the device to a host with only an RS-232 port. If the user also intends to connect the device to a portable PC that is operated in a motor vehicle and provides only an RS-232 port, than it may be desirable to connect the power cable to the 12V power source in the vehicle, rather than to a battery pack. In this case, a power cable with a plug for the cigarette lighter socket is needed.

A partial solution to at least the problem of connecting to various external power sources was disclosed in U.S. Pat. No. 6,007,372 (Wood; 1999), which is assigned to the assignee of the present application and the contents of which are incorporated herein by reference. Wood teaches the use of a GPS data/power cable system that includes a data/power cable that has a separate power cable and a separate data cable attached to a connector in a Y-configuration. In one alternative, the data cable connects to a conventional COM port on a PPC and the power cable plugs into a conventional cigarette lighter receptacle in an automobile. In a second alternative, the power cable plugs into a conventional power connector on the PPC that is provided for input/output peripherals, such as for a typical computer mouse or an extra keyboard.

The Wood cable system did not address the problem of incomparability between USB and RS-232 interfaces. Some GPS receivers are constructed to transceive RS-232 serial data, while others transceive USB serial data. Thus, the buyer of a GPS receiver that transceives USB serial data cannot connect to a host that provides only an RS-232 interface. Cable adapters are available, however, that allow an RS-232 device to interface with a USB host through an RS-232/USB cable and, potentially, an external power source, such as a battery pack or cigarette lighter power source. Nevertheless, a user who is relatively unsophisticated in the use of electronic devices may not initially grasp that he cannot connect his newly acquired USB GPS receiver to an RS-232 host at all, or, in the other case, that he cannot connect the RS-232 GPS receiver to a USB host without acquiring an additional adapter or a different cable. The user, when looking to acquiring a GPS receiver and to connecting it various computer hosts, needs to know what types of serial data ports the various computer hosts provide, and, possibly, the various types of external power sources that will be used, in order to obtain the proper cables and adapters. The fact that various host devices provide interfaces that may not be compatible with the device just purchased often results in confusion or irritation on the part of the user; the necessary acquisition of additional cables and/or adapters that are necessary to obtain the desired functionality adds to the expense as well as irritation of the user.

What is needed, therefore, is a system for transceiving data between a GPS receiver and a host device. What is further needed is such a system that simplifies setup steps and reduces confusion for the user. What is yet further needed is such a system that transceives RS-232 and/or USB signals. What is still yet further needed is such a system that enables simultanous transmission of RS-232 and USB signals.

BRIEF SUMMARY OF THE INVENTION

For the reasons stated above, it is an object of the present invention to provide a multi-mode data transmission system for transceiving RS-232 signals and/or USB signals through a single connector on a multi-mode GPS receiver. It is a further object to provide such a multi-mode GPS receiver that is connectable by means of a single data transmission cable to virtually any computer host device having a USB and/or an RS-232 port.

The multi-mode data transmission system according to the invention includes a multi-mode GPS receiver that is intended to be used with a computer host device. The multi-mode GPS receiver has, therefore, neither a display nor an integrated power pack, but, rather, is a small, lightweight device that plugs into a host device that has a display. Today, most PC's and other portable or handheld host devices provide an RS-232 signal port. Some host devices, however, do not provide the RS-232 interface, but rather, a USB port, which also provides +5V power from the host device to operate the device connected to the USB port. The basic embodiment of the multi-mode GPS receiver according to the invention takes advantage of the increasing availablility of USB ports on host computers and is, therefore, constructed as a USB device without an integrated power source. The multi-mode GPS receiver essentially incorporates a conventional GPS receiver base band chip, an RF chip, and a USB circuit that is operatively connected to the base-band chip on one side and to a connector for connecting to a data transmission cable on the other side.

Since an RS-232 signal port on a host device does not provide power to operate the device connected to it, the GPS receiver must be provided with not only the circuitry to process the RS-232 signal, but also some means of receiving power from a source other than the RS-232 port. The GPS receiver according to the invention encompasses a number of configurations that include RS-232 signal processing capability and connection to an external power source, in addition to USB signal processing capability. In one configuration, the RS-232 circuit is incorporated in the receiver; in another configuration, the RS-232 circuit is incorporated in a battery pack that is plugged into the connector on the multi-mode GPS receiver.

Depending on the output signal from the host device, the multi-mode GPS receiver functions as a USB and/or an RS-232 receiver. In other words, the GPS receiver senses whether a USB signal, an RS-232 signal, or both a USB and an RS-232 are being transmitted and functions accordingly. A battery pack is required when transceiving RS-232 signal. The battery pack is provided in one configuration as part of the cable that connects the GPS receiver with the host device, and, in another configuration, as a separate pack with two connectors: one that plugs directly into the connector on the GPS receiver and one which receives a connector from the data cable.

In most applications, the GPS receiver transceives data with a single host device in either USB or RS-232 mode of operation. In some applications, however, it is desirable to transceive data simultaneously with USB and RS-232 interfaces. For example, entities with large fleets of delivery vehicles typically track the whereabouts and progress of the delivery vehicles via radio transmissions. In such cases, a GPS receiver is semi-permanently connected to an RS-232 port on a radio transmitter in a vehicle. The transmitter transmits the GPS data, which allows the movements of the vehicle to be tracked at a remote location, without further input from the driver of the vehicle. In some cases, the vehicle operator wishes to track his or her location on a display panel of a portable host computer that is mounted on the dash of the vehicle. Using the multi-mode GPS receiver according to the invention, the vehicle driver uses a Y-cable containing both a USB data cable and an RS-232 data cable according to the invention to plug the GPS receiver into the RS-232 port on the radio transmitter and, simultaneously, into the USB port of the portable host computer. Communication between the GPS receiver and the radio transmitter is not affected by connecting the USB data cable GPS receiver to a second, USB port, and, if the vehicle operator wishes to disconnect the GPS receiver from the portable host computer in order to remove it from the vehicle, he or she may do so simply by disconnecting the USB data cable connector on the Y-cable from the portable host computer.

In addition to the convenience and versatility that the multi-mode GPS receiver according to the invention provides with regard to connecting to various host computers, the multi-mode GPS receiver also provides a simple, inexpensive, yet flexible system and method of data logging. Traditionally, GPS data is either logged within the receiver itself, or into an external data collector connected by way of an RS-232 connection. Connecting a conventional two wire $I^2C$ bus interface to the multi-mode GPS receiver allows the user to implement an inexpensive method of data logging that has minimal or no impact on the USB/RS-232 interfaces available for connecting to a portable host computer. The $I^2C$ bus interface consists of two lines: the clock (SCL) and data (SDA). By logging data through this separate bus interface, the USB and RS-232 connections from the multi-mode GPS receiver remain free for other connectivity options.

The multi-mode GPS receiver is not equipped with an ON/OFF switch. When operating in USB mode, power is provided along with the data signal from the USB connection from the host device; when operating in RS-232 mode, power is provided from the external power source. In other words, the ON/OFF state of the GPS receiver is controlled by the power source that is external to the receiver. If a battery pack is used, it is ideally equipped with an ON/OFF switch.

BRIEF DESCRIPTION OF THE DRAWINGS

FIG. 3 is a schematic diagram of a second embodiment of the GPS data transceiver system according to the invention.

FIG. 4 is an illustration of a third embodiment of the multi-mode GPS data transceiver system according to the invention, showing the signal input connector and the power pack connector.

DETAILED DESCRIPTION OF THE INVENTION

Figure 1:
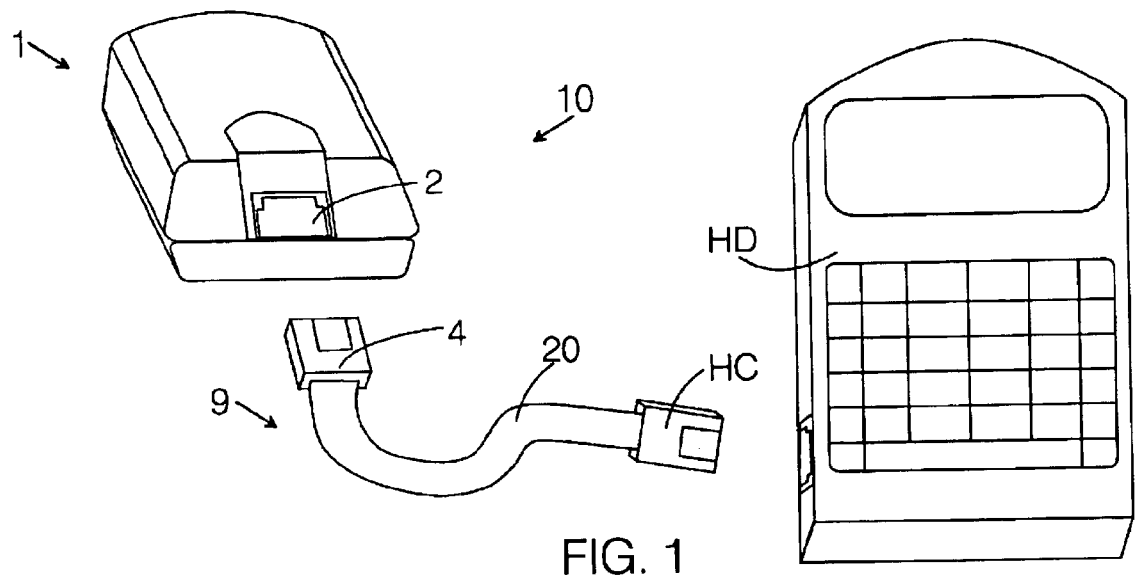
FIG. 1 is an illustration of a first embodiment of the multi-mode GPS data transceiver system according to the invention, showing the GPS receiver connector and a standard USB data transmission cable.
Figure 2:
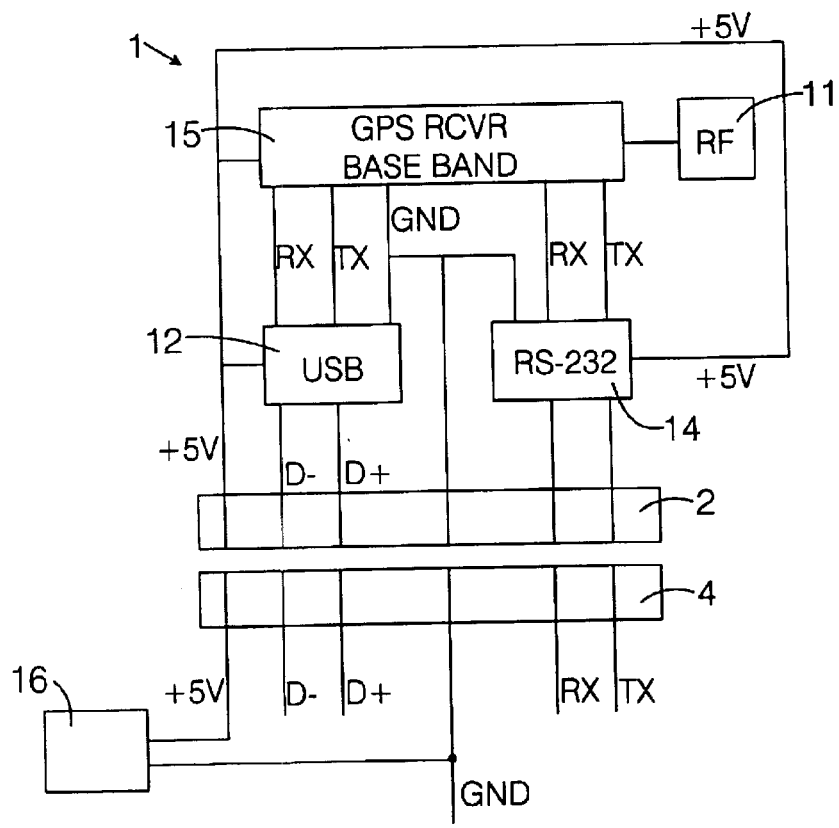
FIG. 2 is a schematic diagram of the multi-mode GPS receiver of FIG. 1, showing the connector, the USB and RS-232 circuitry incorporated into the GPS receiver, and a battery pack electrically connected to the receiver-mating connector on the data transmission cable connector.

FIGS. 1 and 2 show a first embodiment of a GPS data transceiver system 10 according to the invention. The GPS data transceiver system 10 includes a multi-mode GPS receiver 1 and a basic cable assembly 9 that connects the GPS receiver 1 with a host device HD. The host device HD may be any one of a number of computer host devices, such as a portable personal computer, a personal digital assistant, a data logger, etc. The GPS receiver 1 has a multi-mode female connector 2, no display capability, no power source, and no separate connector for receiving power. The basic cable assembly 9 includes a conventional data transmission cable 20 with a multi-mode male connector 4 at one end and a host connector HC at the other end. The multi-mode male connector 4 is connectable to the multi-mode female connector 2 and the host connector HC to the host device HD. In the embodiment shown, the multi-mode male connector 4 is a standard RJ11 male connector and the multi-mode female connector 2 is a standard RJ11 female connector. It should be understood, however, that these male and female multi-mode connectors 2, 4 do not have to be RJ11-type connectors, but may be any type of connector that provides sufficient pins or leads to connect to the circuitry within the multi-mode GPS receiver 1. For example, rather than using standard connectors, it may be desirable to have customized connectors that are distinct in size and shape and fit only a particular GPS receiver. This helps avoid confusion with users who may attempt to insert cable connectors that appear to have the appropriate shape and size, but are, in fact, not wired properly for use with the multi-mode GPS receiver 1. Also, it is understood that while the multi-mode female connector 2 is shown on the GPS receiver 1 and the multi-mode male connector 4 on the basic cable assembly 9, the male-female configurations of the GPS receivers and cables, in general, may be reversed. In FIGS. 1 and 2, as in the remaining figures, the reference designation for a particular element remains the same throughout this detailed description, even if the element is used in different embodiments or configurations.

As can be seen in FIGS. 2 and 3, a chip containing a conventional GPS receiver base band circuit 15, an RF circuit 11, a USB circuit 12, and an RS-232 circuit 14 is incorporated into the multi-mode GPS receiver 1. Suitable components for this circuitry are obtainable from SiRF Technology Inc. (SiRF Star lle/LP), Fastrax OY (iTrax02), and Furuno (GH-79). In this first embodiment, the multi-mode connector 2 is a 6-pin connector that provides connections for power (+5V), USB positive and negative data transmission lines D+ and D− to the USB circuit 12, a shared ground line GND, and receive line RX and data-transmit line TX to the RS-232 circuit 14. The connections for the USB positive and negative data transmission lines D+ and D− in the multi-mode connector 2 are referred to collectively as a USB port 31 and the connections for the RS-232 data-receive line RX and data-transmit line TX are referred to collectively as an RS-232 port 33. The ground line GND is shared between the USB and the RS-232 circuitry. FIG. 2 also shows a battery pack 16 connected to the multi-mode male connector 4, whereby it should be understood that the battery pack 16 is required only when the multi-mode GPS receiver 1 is connected to a host computer that outputs RS-232.

FIG. 3 is a schematic of a second embodiment of a GPS data transceiver system 10A that includes a modified multi-mode GPS receiver 1A. As can be seen, the RS-232 circuitry ties into a USB microcontroller 12A. Suitable components for this circuitry are obtainable from Microchip Technology (PIC 16C745) and Cypress Semiconductor (CY7C63001A). When the GPS receiver 1A transceives data, the microcontroller 12A shuts down the RS-232 circuit if it detects signal on the USB port 31 and not at the RS-232 port 33, and vice versa, thereby reducing power consumption.

Both embodiments of the GPS data transceiver system 10, 10A shown in FIGS. 2 and 3, respectively, permit data to be transceived simultaneously under USB and RS-232 protocols. With the circuit configuration shown in FIG. 2, the GPS base band has two serial outputs and so, is capable of running data under the RS-232 protocol from one port and under the USB protocol from the other port. With the circuit configuration shown in FIG. 3, the GPS base band has only one output and, consequently, the data signal must be split, running the data under the USB protocol out the USB port 31 and under the RS-232 protocol out the RS-232 port 33. An example of an application in which it is desirable to simultaneously transmit data under USB and RS-232 protocols is given below.

Figure 5:
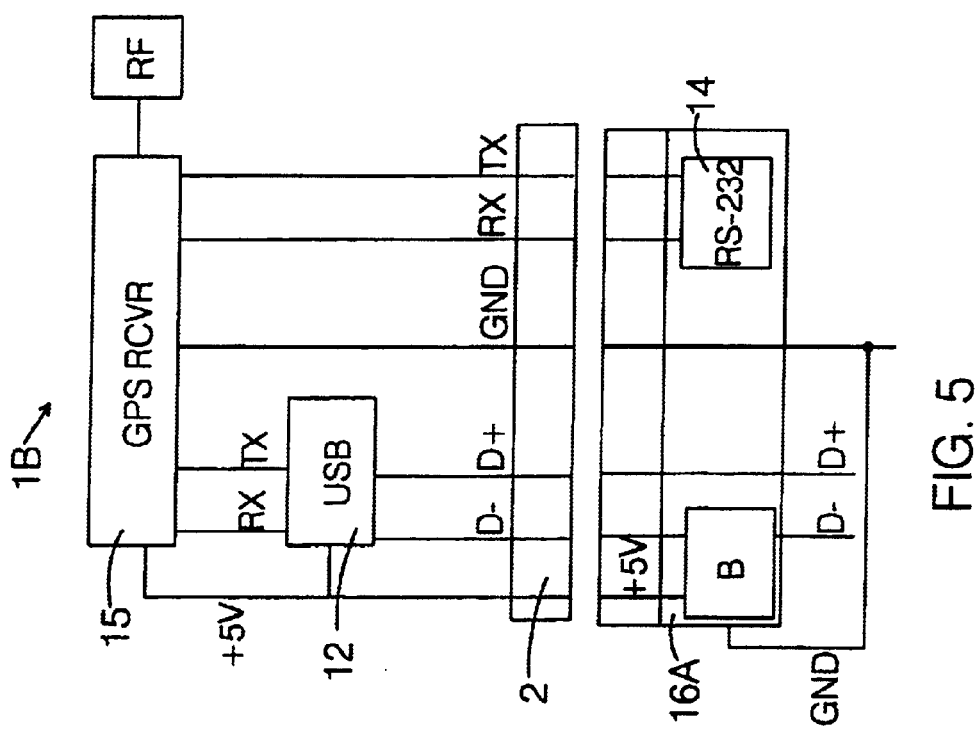
FIG. 5 is a schematic diagram of the multi-mode GPS data transreceiver system of FIG. 4, showing the 6-pin connector, the USB circuitry incorporated into the receiver, and the power pack with the RS-232 circuitry.

FIGS. 4 and 5 illustrate a third embodiment of the GPS data transceiver system 10B that includes a second modified GPS receiver 1B, a multi-mode male connector 4, and the basic cable assembly 9. The multi-mode cable connector 5 includes male connector 4A that connects to the multi-mode female connector 2, a female connector 2A that is connectable with the multi-mode male connector 4, and a modified battery pack 16A. In this third embodiment, the RS-232 circuit 14 is incorporated into the battery pack 16A, rather than in the GPS receiver 1B. To operate the GPS receiver 1B with a host computer that outputs RS-232, the connector HC of the basic cable assembly 9 is connected to the host computer and the multi-mode male connector 4 is connected to the multi-mode cable connector 5, which is then connected directly into the multi-mode connector 2 on the GPS receiver 1B. The multi-mode male connector 4 with the modified battery pack 16A is not necessary when operating the GPS receiver 1B with a computer host that outputs USB, and the basic cable assembly 9 can be connected directly to the multi-mode connector 2. The multi-mode cable connector 5 is constructed such that if the GPS receiver 1B is connected to a host computer that outputs USB, the GPS receiver 1B will pass the USB signal through to the multi-mode connector 2.

As shown in FIGS. 2, 3, and 5, the multi-mode female connector 2 is a 6-pin connector. The scope of the invention encompasses a standard RJ11 6-pin connector, a customized 6-pin connector, or, of course, a customized or standrd connector that carries more than 6 leads or terminals, for example, a DB-9 pin or a mini-Din connector.

The GPS data transceiver system 10, 10A, 10B according to the invention includes various configurations of the basic cable assembly 9 that are used with the various embodiments of the GPS receiver 1, 1A, 1B. FIG. 1 shows the basic cable assembly 9, comprising the USB data transmission cable 20, a USB host connector 7 and the multi-mode cable connector 4. FIGS. 6A–6D show various configurations 9A–9D of data transmission cable assemblies. It should be understood that, while the USB and RS-232 cables are shown depending directly from the multi-mode male connector 4, it is, of course, possible to provide the cable assemblies in a Y-configuration, whereby the USB and RS-232 cables join a dual cable that then feeds into the multi-mode male connector 4.

Figure 6B:
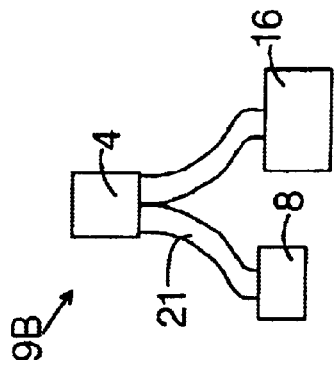
FIG. 6B is an illustration of an RS-232 data transmission cable with battery pack.
Figure 6A:
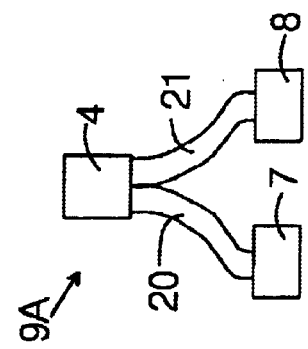
FIG. 6A is an illustration of a combination USB/RS-232 data transmission cable assembly with battery pack.
Figure 6D:
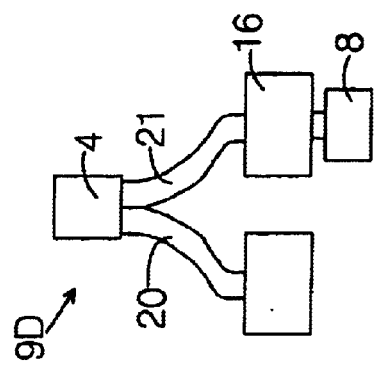
FIG. 6D is an illustration of a combination USB/RS-232 data transmission cable assembly, without an external power source.
Figure 6C:
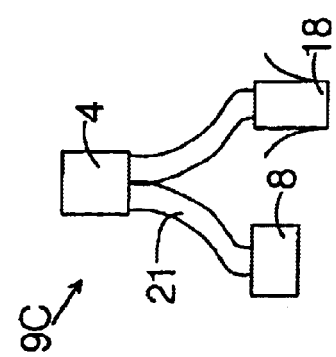
FIG. 6C is an illustration of an RS-232 data transmission cable with plug for a cigarette lighter receptacle.

FIG. 6A illustrates a combination USB/RS-232 cable assembly 9A, which has an RS-232 host connector 8, as well as the USB host connector 7, and does not include a power source. When both host connectors 7, 8 of the the USB/RS-232 cable assembly 9A are connected to a USB and an RS-232 data port, respectively, a separate external power source, such as the battery pack 16 or the cigarette lighter plug 18, is not necessary as the power supplied through the USB interface will power the GPS receiver 1. FIG. 6B shows an RS-232 cable assembly 9B that comprises a RS-232 data transmission cable 21, the RS-232 host connector 8, as well as the battery pack 16, and the multi-mode male connector 4. FIG. 6C shows a variation of the RS-232 cable assembly 9B, wherein the battery pack 16 is replaced with a plug 18 that is connectable to a standard cigarette lighter receptacle in a motor vehicle. FIG. 6D shows a second combination USB/RS-232 cable assembly 9D, comprising the USB data transmission cable 20 and the corresponding connector 7, as well as an RS-232 data transmission cable 21, the battery pack 16, and the RS-232 host connector 8.

The multi-mode GPS receivers 1, 1A, 1B are not equipped with an ON/OFF switch. When operating in USB mode, power is provided along with the data signal from the USB connection from the host device; when operating in RS-232 mode, power is provided from the external power source. In other words, the ON/OFF state of the GPS receiver is controlled by the power source that is external to the receiver. If a battery pack is used, it is ideally equipped with an ON/OFF switch.

Figure 7:
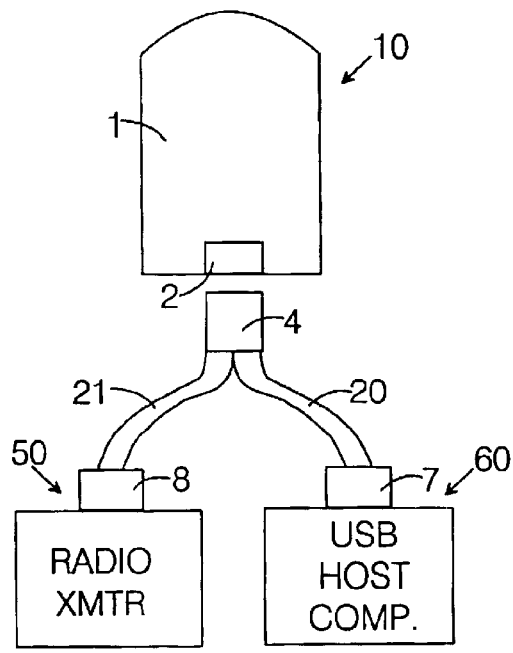
FIG. 7 is a schematic illustration of the GPS data transceiver system according to the invention, showing the GPS receiver connected simultaneously to a USB host computer and an RS-232 radio transmitter.

FIG. 7 is a schematic illustration of the the GPS data transceiver system 10 according to the invention, connected to a USB host computer 60 and an RS-232 radio transmitter 50. In this configuration, data is transceivable through the multi-mode connector 2 simultaneously under the USB and RS-232 protocols. An external power source, such as a battery pack or cigarette lighter plug, is not necessary in this configuration, as the power supplied through the USB data port will power the GPS receiver 1.

Figure 8:
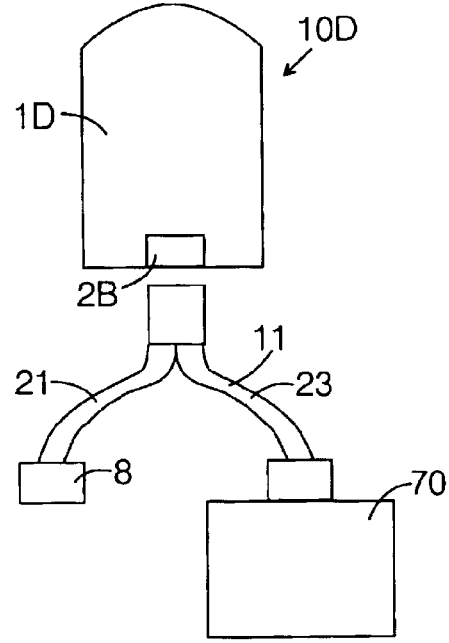
FIG. 8 is a block diagram of the fourth embodiment of the GPS data transceiver system according to the invention, showing the GPS receiver connected to a data logger.
Figure 9:
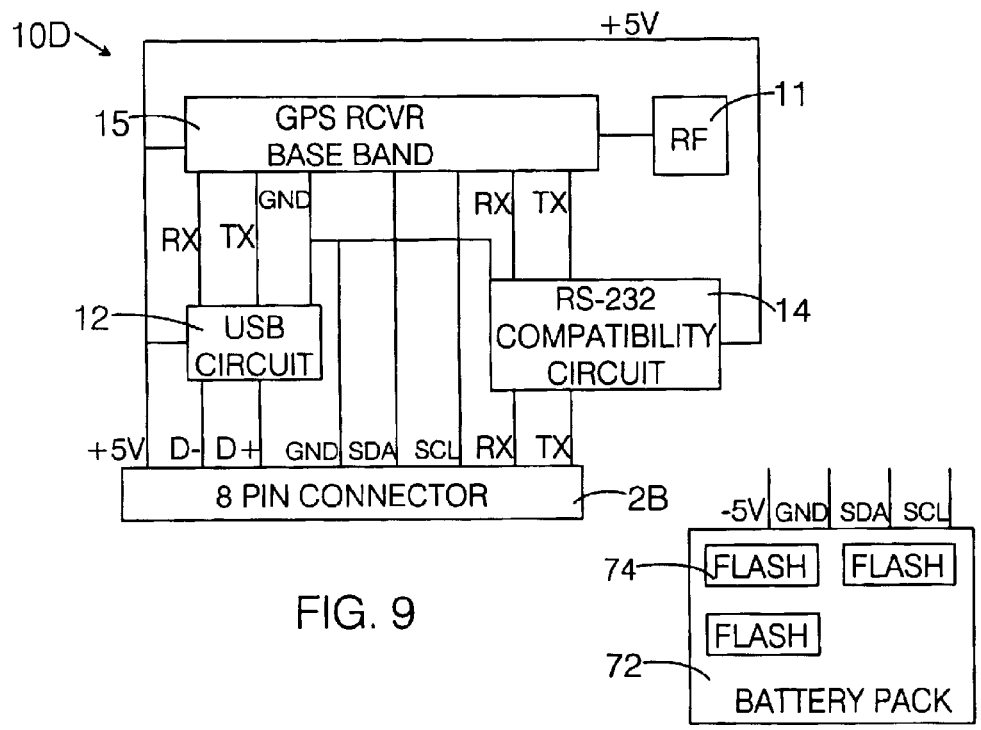
FIG. 9 is a schematic illustration of the GPS data transceiver system of FIG. 8, showing the flash circuitry integrated into the battery pack.

FIGS. 8 and 9 are schematic illustrations of a fourth embodiment of a GPS data transceiver system 10D according to the invention. The GPS data transceiver system 10D includes a modified GPS receiver 1D that incorporates a conventional $I^2C$ flash memory chip 74, either in a modified battery pack 72 or in a separate pass-through data-logging module. FIG. 8 shows the modified GPS receiver 1D with a modified multi-mode connector 2B, and a cable assembly 11 that includes the RS-232 data transmission cable 21 and the host connector 8, as well as an $I^2C$ interface cable 23 that connects to a data logger 70. FIG. 9 illustrates schematically the electrical connections in the modified multi-mode connector 2B, which now comprises 8 pins. The additional two pins provide the means for implementing a simple, inexpensive, yet flexible method of data logging. The $I^2C$ bus includes two lines, a clock line (SCL) and a data line (SDA), and provides an interface between a master and a slave. In the method according to the invention, the multi-mode GPS receiver 1D represents the master and the data-logging module 70 represents the slave. The slave devices on the $I^2C$ bus are addressable, so the total memory capacity of the data logger is configurabled to any number of memory configurations. Incorporating the $I^2C$ two-wire bus into the multi-mode GPS receiver 1D also eliminates the need for RS-232 circuitry and a microcontroller for managing the memory [in the data logger?] and, therefore, reduces the overall cost of the data-logging module. Furthermore, one data-logging module is also replaceable with another data-logging module, thereby facilitating the design of more advanced logging applications.

A potential scenario for operating the modified GPS receiver 1D through both USB and RS-232 interfaces simultaneously would be in a fleet tracking situation in which both a USB host computer 60 and a radio transmitter 50 are provided in the vehicle. Typically, the radio transmitter 50 is permanently installed in the fleet vehicle. The modified GPS receiver 1D is semi-permanently connected to the radio transmitter 50 and allows operational tracking of the fleet vehicle movement without any further intervention from the vehicle operator. The vehicle operator may simultaneously track his or her location on the host computer 60 without interrupting the operation of the radio transmitter 50 simply by plugging the modified GPS receiver 1D via the cable assembly 9A into the USB port on the host computer 60. The host computer 60 is removable from the vehicle by disconnecting the USB connector 7 from the host computer 60. Once again, disconnecting the host computer 60 does not interrupt any of the connectivity between the modified GPS receiver 1D and the radio transmitter 50.

The detailed description of the invention includes descriptions of specific embodiments. It is understood, however, that a person skilled in the art is capable of implementing many variations and modifications of the invention without straying from the intended scope of the present invention.

What is claimed is:

1. A multi-mode GPS-receiver for use with a host device, said multi-mode GPS receiver comprising:
    a GPS receiver housing having a single multi-mode-device connector connector;
    a GPS-receiver baseband circuit;
    a USB circuit with a USB port; and
    an RS-232 circuit with an RS-232 port;
    wherein said GPS-receiver base-band circuit and said USB circuit are incorporated within said housing; and
    wherein said USB sort and said RS-232 port are incorporated into said multi-mode device connector.

2. The multi-mode GPS-receiver of claim 1, wherein a USB signal and an RS-232 signal are simultaneously processsable by said GPS-receiver base-band circuit.

3. The multi-mode GPS-receiver of claim 1, wherein said RS-232 circuit is operatively connected to said USB circuit, wherein said RS-232 signal is detectable by said USE circuit, and wherein said USB circuit includes a microcontroller that switches said RS-232 circuit on upon detecting said RS-232 signal.

4. The multi-mode GPS-receiver of claim 1, wherein said RS-232 circuit is incorporated within said GPS receiver housing.

5. The multi-mode GPS-receiver of claim 1, wherein said RS-232 circuit is external to said GPS-receiver housing and is connectable to said GPS-receiver base-band circuit via a connection to said multi-mode device connector.

6. A GPS data transceiver system for use with a host device, said system comprising:
    said multi-mode GPS-receiver of claim 1; and
    a data cable having a first data-cable connector that is connectable to said multi-mode device connector and a second data-cable connector that is connectable to said host device.

7. The GPS data transceiver system of claim 6, further comprising an external power source that is operatively connectable to said GPS-receiver base-band circuit via said multi-mode device connector.

8. The GPS data transceiver system of claim 7, wherein said external power source is a battery pack with an ON/OFF switch.

9. The GPS data transceiver system of claim 8, wherein said data cable includes a data-cable connector that is operatively connectable to said multi-mode device connector, a first cable having a USB-compatible cable connector, and a second cable having an RS-232-compatible cable connector, said first cable and said second cable being connected to said data-cable connector, and wherein said USB-compatible cable connector is connectable to a USB host device, and said RS-232-compatible cable connector is connectable to an RS-232 host device.

10. The GPS data transceiver system of claim 9, wherein said USB-compatible cable connector and said RS-232-compatible cable connector are simultaneously connectable to said USB host device and said RS-232 host device, respectively.

11. The GPS data transceiver system of claim 9, wherein said RS-232 host device is a radio transmitter and said USB host device is a data logger.

12. The GPS data transceiver system of claim 8 further comprising an RS-232 unit that includes said battery pack and said RS-232 circuit.

13. The GPS data transceiver system of claim 12, wherein said RS-232 unit is incorporated into said data cable.

14. The GPS data transceiver system of claim 12, wherein said RS-232 unit is operatively connectable to said multi-mode GPS-receiver via said multi-mode device connector and to said data cable, so as to provide a power source for said multi-mode GPS-receiver for transceiving RS-232 signals.

15. The GPS data transceiver system of claim 7, wherein said external power source is a plug that is connectable to a cigarette lighter receptacle in an automobile.

16. A GPS data transceiver system for use with a host device, said system comprising:

a GPS receiver housing having a multi-mode device connector;

a GPS-receiver base-band circuit;

a USB circuit with a USB port;

an RS-232 circuit with an RS-232 port; and a data cable assembly;

wherein said GPS-receiver base-band circuit, said RS-232 circuit, and said USB circuit are incorporated within said housing and said USB;

port and said RS-232 port are incorporated into said multi-mode device connector;

wherein a USB signal and/or an RS-232 signal is processable by said GPS-receiver baseband circuit; and wherein said data cable assembly has a data-cable-connector that is connectable to said multi-mode device connector, a host-device connector that is connectable to a host device, and a data cable therebetween.

17. The system of claim 16, wherein said data cable assembly includes a first data cable, wherein said host-device connector is a USB-host-device connector that is connectable to a USB host device and a second data cable wherein said host-device connector is an RS-232-host-device connector that is connectable to an RS-232 host device;

wherein said first data cable and said second data cable are operatively connected to said data-cable-connector;

wherein said data cable assembly is connectable to said multi-mode-device connector and simultaneously to said USB host device and said RSB host device, and wherein USB signals and RS-232 signals are simultaneously processable by said GPS-receiver base-band circuit.

18. The system of claim 16, wherein said data cable assembly is a USB cable, wherein said host-device-connector is a USB connector that is connectable to a USB host device, and wherein USB signals are processable by said GPS-receiver base-band circuit.

19. The system of claim 16, wherein said data cable assembly is an RS-232 cable, wherein said host-device connector is an RS-232 connector that is connectable to an RS-232 host device, and wherein said battery pack is incorporated in said data cable assembly; and wherein said RS-232 signals are processable by said GPS-receiver base-band circuit.

20. A GPS data transceiver system for use with a host device, said system comprising:

a GPS receiver housing having a multi-mode device connector with a USB port and an RS-232 port;

a GPS-receiver base-band circuit;

a USB circuit;

an RS-232 circuit and a battery pack; and a data cable assembly;

wherein said GPS-receiver baseband circuit, said RS-232 circuit, and said USB circuit are incorporated within said housing and said USB circuit is operatively connected to said USB port and to said GPS-receiver base-band circuit;

wherein said data cable assembly has a data-cable-connector that is connectable to said multi-mode device connector, a host-device-connector that is connectable to a host device, and a data cable therebetween;

wherein said RS-232 and battery pack are external to said GPS receiver housing and are operatively connected to said GPS-receiver base-band circuit via said RS-232 port in said multi-mode device connector.

* * * * *

UNITED STATES PATENT AND TRADEMARK OFFICE
CERTIFICATE OF CORRECTION

PATENT NO. : 6,844,846 B1
DATED : January 18, 2005
INVENTOR(S) : Riday

It is certified that error appears in the above-identified patent and that said Letters Patent is hereby corrected as shown below:

Column 5,
Line 11, repelace "receive" with -- data-receive --

Column 7,
Line 48, delete "[in the data logger?]"

Column 8,
Line 20, replace "sort" with -- port --
Line 27, replace "USE" with -- USB --

Column 9,
Lines 28-29, delete ";" and line break

Column 10,
Line 5, replace "RSB" with -- RS-232 --

Signed and Sealed this

Ninth Day of August, 2005

JON W. DUDAS
*Director of the United States Patent and Trademark Office*